(12) United States Patent
Binnig et al.

(10) Patent No.: US 7,868,789 B1
(45) Date of Patent: Jan. 11, 2011

(54) DICTIONARY-BASED ORDER-PRESERVING STRING COMPRESSION FOR MAIN MEMORY COLUMN STORES

(75) Inventors: Carsten Binnig, Elztal (DE); Franz Faerber, Walldorf (DE); Stefan Hildenbrand, Altdorf (CH)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/493,210

(22) Filed: Jun. 28, 2009

(51) Int. Cl.
*H03M 7/34* (2006.01)
(52) U.S. Cl. .......................................... 341/51; 382/233
(58) Field of Classification Search .............. 341/50–90; 382/233, 244, 100
See application file for complete search history.

(56) References Cited

U.S. PATENT DOCUMENTS

| 6,121,901 A * | 9/2000 | Welch et al. ................... 341/51 |
| 7,164,370 B1 * | 1/2007 | Mishra ......................... 341/51 |
| 7,263,238 B2 * | 8/2007 | Singh .......................... 382/244 |

OTHER PUBLICATIONS

Daniel J. Abadi, Samuel R. Madden and Miguel C. Ferreira; Integrating Compression and Execution in Column-Oriented Database Systems; Proceedings of the 2006 ACM SIGMOD International Conference on Management of Data; 2006, pp. 671-682, (http://db.csail.mit.edu/projects/cstore/abadisigmod06.pdf).
Nikolas Askitis and Ranjan Sinha; HAT-trie: A Cache-conscious Trie-based Data Structure for Strings; Proceedings of the thirtieth Australasian conference on Computer science (2007), pp. 97-105, (http://crpit.com/confpapers/CRPITV62Askitis.pdf).
Nikolas Askitis and Justin Zobel; Cache-Conscious Collision Resolution in String Hash Tables; Proceedings of 12th international conference, SPIRE 2005, pp. 91-102; (http://goanna.cs.rmit.edu.au/~jz/fulltext/spire05.pdf).
Rudolf Bayer and Karl Unterauer; Prefix B-Trees; ACM Transactions on Database Systems (TODS), 1977; vol. 2 , Issue 1, pp. 11-26 (http://wwwbayer.in.tum.de/cgi-webcon/webcon/lehrstuhldb/download/52/application/pdf).
Jon L. Bentley and Robert Sedgewick; Fast Algorithms for Sorting and Searching Strings; Proceedings of the Eighth Annual ACM-SIAM Symposium on Discrete algorithms, 1997, pp. 360-369 (http://www.citeulike.org/user/sudhanshu_goswami/article/707565).
Philip Bohannon, Peter McLlroy and Rajeev Rastogi; Main-Memory Index Structures with Fixed-Size Partial Keys; Proceedings of the 2001 ACM SIGMOD International Conference on Management of Data, 2001, pp. 163-174; (http://portal.acm.org/citation.cfm?id=375681).
Zhiyuan Chen, Johannes Gehrke and Flip Korn; Query Optimization In Compressed Database Systems; ACM SIGMOD Record, vol. 30, Issue 2 (Jun. 2001), pp. 271-282 (http://www.cs.cornell.edu/johannes/papers/2001/sigmod2001-compression.pdf).

(Continued)

*Primary Examiner*—Lam T Mai

(57) ABSTRACT

Methods and systems are described that involve usage of dictionaries for compressing a large set of variable-length string values with fixed-length integer keys in column stores. The dictionary supports updates (e.g., inserts of new string values) without changing codes for existing values. Furthermore, a shared-leaves approach is described for indexing such a dictionary that compresses the dictionary itself while offering access paths for encoding and decoding.

20 Claims, 12 Drawing Sheets

OTHER PUBLICATIONS

Jun Rao and Kenneth A. Ross; Cache Conscious Indexing for Decision-Support in Main Memory; Proceedings of the 25th International Conference on Very Large Data Bases; 1999, pp. 78-89 (http://www1.cs.columbia.edu/~library/TR-repository/reports/reports-1998/cucs-019-98.pdf).

Ranjan Sinha, David Ring and Justin Zobel; Cache-Efficient String Sorting Using Copying; ACM Journal of Experimental Algorithmics (ACM JEA), 11(1.2), 2006 (http://www.cs.mu.oz.au/~rsinha/papers/SinhaRingZobel-2006.pdf).

Mike Stonebraker et al.; C-Store: A Column-oriented DBMS; Proceedings of the 31st international conference on Very large data bases; Session: Research session: architectural issues, 2005, pp. 553-564 (http://db.csail.mit.edu/projects/cstore/vldb.pdf).

Jingren Zhoul and Kenneth A. Ross; Buffering Accesses to Memory-Resident Index Structures; Proceedings of the 29th international conference on Very large data bases—vol. 29, 2003, pp. 405-416 (http://www1.cs.columbia.edu/~kar/pubsk/buffer.pdf).

Jonathan Goldstein et al.; Compressing Relations and Indexes; Proceedings of the Fourteenth International Conference on Data Engineering; 1998, pp. 370-379 (http://portal.acm.org/citation.cfm?id=656226).

G. Antoshenkov et al.; Order Preserving String Compression; Proceedings of the Twelfth International Conference on Data Engineering, 1996, pp. 655-663 (http://ieeexplore.ieee.org/xpl/freeabs_all.jsp?arnumber=492216).

Ian H. Witten et al.; Managing Gigabytes: Compressing and Indexing Documents and Images—2nd edition; Chapter Two—Text Compression; Morgan Kaufmann Publishers, Inc., USA, 1999; pp. 82; (http://ww2.cs.mu.oz.au/mg/blurb.pdf).

Ian H. Witten et al.; Managing Gigabytes: Compressing and Indexing Documents and Images—2nd edition; Chapter Three—Indexing; Morgan Kaufmann Publishers, Inc., USA, 1999; pp. 49; (http://ww2.cs.mu.oz.au/mg/blurb.pdf).

Ian H. Witten et al.; Managing Gigabytes: Compressing and Indexing Documents and Images—2nd edition; Chapter Four—Querying; Morgan Kaufmann Publishers, Inc., USA, 1999; pp. 70; (http://ww2.cs.mu.oz.au/mg/blurb.pdf).

Ian H. Witten et al.; Managing Gigabytes: Compressing and Indexing Documents and Images—2nd edition; Chapter Five—Index Construction; Morgan Kaufmann Publishers, Inc., USA, 1999; pp. 39; (http://ww2.cs.mu.oz.au/mg/blurb.pdf).

European Search Report for EP Application No. 10004976.6, mailed on Sep. 9, 2010, 11 pages.

Daniel J. Abadi et al.; Integrating Compression and Execution in Column-Oriented Database Systems; Proceedings of the 2006 ACM SIGMOD international conference on Management of data; pp. 671-682; (http://db.csail.mit.edu/projects/cstore/abadisigmod06.pdf).

Gennady Antoshenkov et al.; Order preserving string compression; Proceedings of the Twelfth International Conference on Data Engineering, 1996; pp. 655-663; (http://research.microsoft.com/apps/pubs/default.aspx?id=68322).

Zhiyuan Chen et al.; Query Optimization in Compressed Database Systems; SIGMOD Record, ACM, New York, NY US, vol. 30, Issue 2 (Jun. 2001); pp. 271-282 (http://portal.acm.org/citation.cfm?id=376284.375692).

Till Westmann et al.; The Implementation and Performance of Compressed Databases; SIGMOD Record, ACM, New York, NY US, vol. 29, Issue 3, 2000; pp. 55-67 (http://portal.acm.org/citation.cfm?id=362137).

Mario A. Nascimento et al.; Indexing Bitemporal Databases Via Trees with Shared Leaves - The SLT Approach, 1995, pp. 28, retrieved from Internet (http://citeseerx.ist.psu.edu/viewdocdownload?doi=10.1.1.54.4479&rep=rep1&type=pdf).

W.P. Cockshott et al.; High Performance Operations Using a Compressed Database Architecture; The Computer Journal (1998); vol. 41; No. 5; Oxford University Press; Surrey GB; pp. 283-296 (http://comjnl.oxfordjournals.org/content/41/5/283.abstract).

G. Graefe et al.; Data compression and database performance; Applied Computing 1991; Proceedings of the 1991 Symposium on Kansas City MO, USA; pp. 22-27 (http://ieeexplore.ieee.org/xpl/freeabs_all.jsp?arnumber=143840).

\* cited by examiner

US 7,868,789 B1

DICTIONARY-BASED ORDER-PRESERVING STRING COMPRESSION FOR MAIN MEMORY COLUMN STORES

TECHNICAL FIELD

Embodiments of the invention generally relate to the software arts, and more specifically, to data structures that support an order-preserving dictionary compression for string attributes with a large domain size that may change over time.

BACKGROUND

In the field of computing, a database management system (DBMS) is a set of software programs that controls the organization, storage, management, and retrieval of data in a database storage unit. Traditionally, the DBMS is a row-oriented database system; however, there are database systems that are column-oriented. The column-oriented database systems store their content by column rather than by row. This may have advantages for databases, where the aggregates are computed over large numbers of similar data items. A column-oriented implementation of a DBMS would store attributes of a given column in sequence, with the column values for the same column stored in sequence, with the end of one column followed by the beginning of the next column. Column-oriented database systems may be more efficient when an aggregate has to be computed over many rows but only for a smaller subset of all columns of data. This may be so at least because, reading that smaller subset of data can be faster than reading all data. Column-oriented database systems may also be more efficient when new values of a column are supplied for all rows at once, because that column data can be written efficiently and can replace old column data without interfering in any other columns for the rows.

SUMMARY

Methods and systems are described that involve data structures that support order-preserving dictionary compression of variable-length string attributes where the domain size is large or not known in advance. In one embodiment, the method includes propagating a plurality of string values to the compressed data of a shared-leaves structure of a dictionary via an encode index. A plurality of order-preserving integer codes is obtained for the plurality of string values via a lookup operation. If a subset of the plurality of integer codes was not found during the obtainment, a subset of the plurality of string values for which the subset of the plurality of integer codes was not found is inserted into the shared-leaves structure. The method also includes generating the subset of the plurality of integer codes for the corresponding subset of the plurality of string values. Finally, a list of the order-preserving plurality of integer codes is provided, wherein the list includes the generated subset of the plurality of integer codes as well.

In one embodiment, the system includes a column-oriented database system and a dictionary-based storage unit specifying a mapping between a plurality of variable-length string values and a plurality of integer codes in the column-oriented database system. Further, the system includes shared-leaves data structures that hold the data of the dictionary-based storage unit in sort order in their leaves. In addition, a processor in communication with the dictionary-based storage unit is included, wherein the processor is operable to encode the plurality of variable-length string values to the plurality of integer codes and decode the plurality of integer codes to the plurality of variable-length string values using the shared-leaves data structures.

These and other benefits and features of the embodiments of the invention will be apparent upon consideration of the following detailed description of preferred embodiments thereof, presented in connection with the following drawings in which like reference numerals are used to identify like elements throughout.

BRIEF DESCRIPTION OF THE FIGURES

The invention is illustrated by way of example and not by way of limitation in the figures of the accompanying drawings in which, like references, indicate similar elements. It should be noted that references to "an" or "one" embodiment in this disclosure are not necessarily to the same embodiment, and such references mean at least one.

DETAILED DESCRIPTION

Embodiments of the invention relate to data structures that support an order-preserving dictionary compression for string attributes with a large domain size that is likely to change over time. It is believed that the column-oriented database systems perform better than the traditional row-oriented database systems on analytical workloads. Lightweight compression schemes for column-oriented database systems may enable query processing on compressed data and thus improve query processing performance. Dictionary encoding replaces variable-length attribute values with shorter, fixed-length integer codes. To compress column data in this way, existing column stores usually create a dictionary array of distinct values and then store each attribute value as an index into that array. Dictionaries may be used in column stores if the domain size is small.

Bit packing can be used on top of a dictionary to compress the data further by calculating the minimal number of bits needed to code the maximal index into the dictionary. Bit packing is useful if the size of the domain is stable or known in advance, but in application scenarios the domain size may increase over time. If the domain size is not known in advance, a column store may analyze the first bulk load of data to find out the current domain size of a given attribute and then derive the minimal number of bits (for bit packing). If subsequent bulk loads contain new values, all the previously loaded data can be decoded and then encoded again with the new load using more bits.

Column stores often use order-preserving compression schemes to speed up expensive query operations because the operations can then be executed directly on the encoded data. However, such compression schemes generate either variable-length codes that are expensive or fixed-length codes that are difficult to extend. For large dictionaries where the domain size is not known in advance, sorted arrays and fixed-length integer codes for indexes are too expensive.

Figure 1:
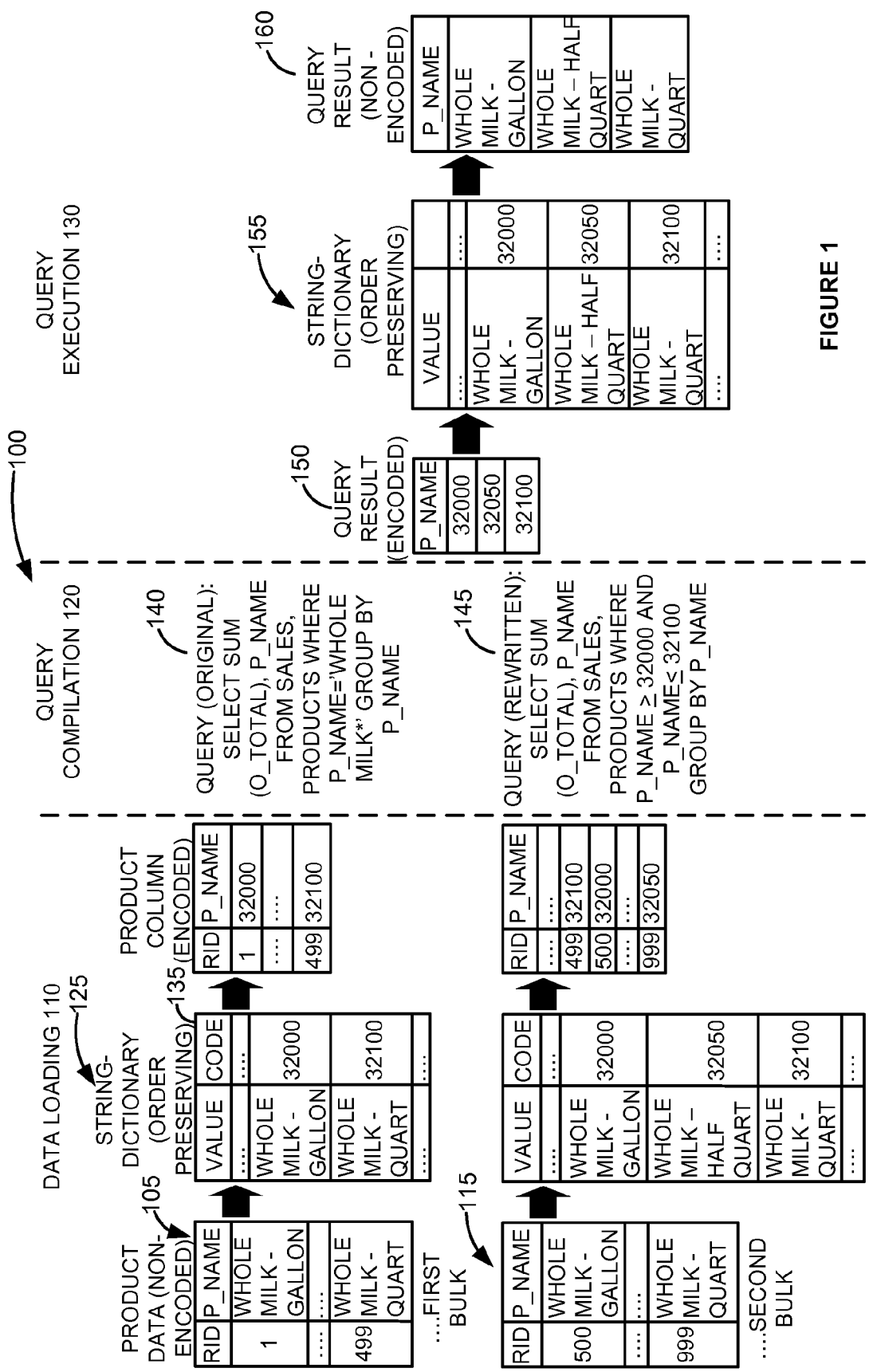
FIG. 1 is a diagram of an embodiment for order-preserving dictionary compression of variable-length string attributes.

FIG. 1 is a diagram of an embodiment for order-preserving dictionary compression of variable-length string attributes. In an embodiment, data structures are defined that support order-preserving dictionary compression of variable-length string attributes where the domain size is large or not known in advance. The generated integer codes have a fixed length and do not use bit packing. A dictionary may be defined as a table that specifies a mapping between string values and integer codes. Index structures for access to the dictionary may be defined that support: data loading 110, query compilation 120, and query execution 130. Process 100 begins with data loading 110. Usually, data is loaded bulk-wise into a data warehouse. In an embodiment, the dictionary supports encoding of bulks of string values using integer codes. The encoding may consist of the following operations: 1) bulk lookup of the integer codes for the string values in the dictionary; and 2) bulk insertion of new string values plus generation of order-preserving integer codes for the new values. FIG. 1 shows how two bulks of product data, bulk 105 and bulk 115, are loaded in a string dictionary (e.g., 125) and encoded using integer codes 135.

Further, process 100 includes query compilation 120. To execute analytical queries on encoded data, it is necessary to rewrite the query predicates. A predicate is a phrase template that describes a property of objects or a relationship among objects represented by the variables. For example, string dictionary 125 includes a list of string values: Whole Milk—Gallon, Whole Milk—Quart, etc, wherein "Whole Milk" is the predicate of these strings. Query compilation 120 involves rewriting a string constant in an equality predicate (e.g., p_name="Whole Milk—Gallon") or in a range predicate (e.g., p_name≧"Whole Milk—Gallon") with the corresponding integer code. An order-preserving encoding scheme allows the string constants of equality and range predicates to be replaced by integer codes, and prefix predicates (e.g., p_name="Whole Milk*") to be mapped to range predicates. For example, original query 140 is rewritten in query 145, by rewriting string constant p_name with prefix predicate "Whole Milk*" into a range predicate 32100≧p_name≧32000. In an embodiment, the string dictionary 125 supports lookup operations to rewrite string constants as well as string prefixes. Process 100 also includes query execution 130. During query execution 130, encoded query results 150 are decoded using the dictionary 125. In an embodiment, the string dictionary 155 supports decoding of the encoded query results 150 given as a list of integer codes to generate query results as string values 160. The encoded query results 150 are decoded to a list of non-encoded query results 160 that represents string values 105.

In an embodiment, the string dictionary is a table T with two attributes: T=(value, code). Table T defines a mapping of variable-length string values (defined by the attribute value) to fixed-length integer codes (defined by the attribute code) and vice versa. The dictionary supports the following operations for encoding and decoding string values and to enable rewrite of the query predicates: 1) encode: values→codes; 2) decode: codes→values; 3) lookup: (value, type)→code; and 4) lookup: prefix→(mincode, maxcode). The "encode: values→codes" operation is used during data loading 110 to encode the data of a string column (i.e., the values) with the corresponding integer codes (i.e., the codes). This operation includes the lookup of codes for those strings that are already in the dictionary and the insertion of new string values as well as the generation of order-preserving codes for these new values. The "decode: codes→values" operation is used during query processing 130 to decode bulk results using the corresponding string values. The "lookup: (value, type) →code" operation is used during query compilation 120 to rewrite a string constant in an equality-predicate (e.g., p_name="Whole Milk—Gallon") or in a range-predicate (e.g., p_name≧"Whole Milk—Gallon") with the corresponding integer code. The parameter "type" specifies whether a dictionary should execute an exact-match lookup or return the integer code for the next smaller string value. The "lookup: prefix→(mincode, maxcode)" operation is used during query compilation 120 to rewrite the prefix of a prefix-predicate (e.g., p_name="Whole Milk*") with the corresponding integer ranges (i.e., the mincode and the maxcode).

Figure 2:
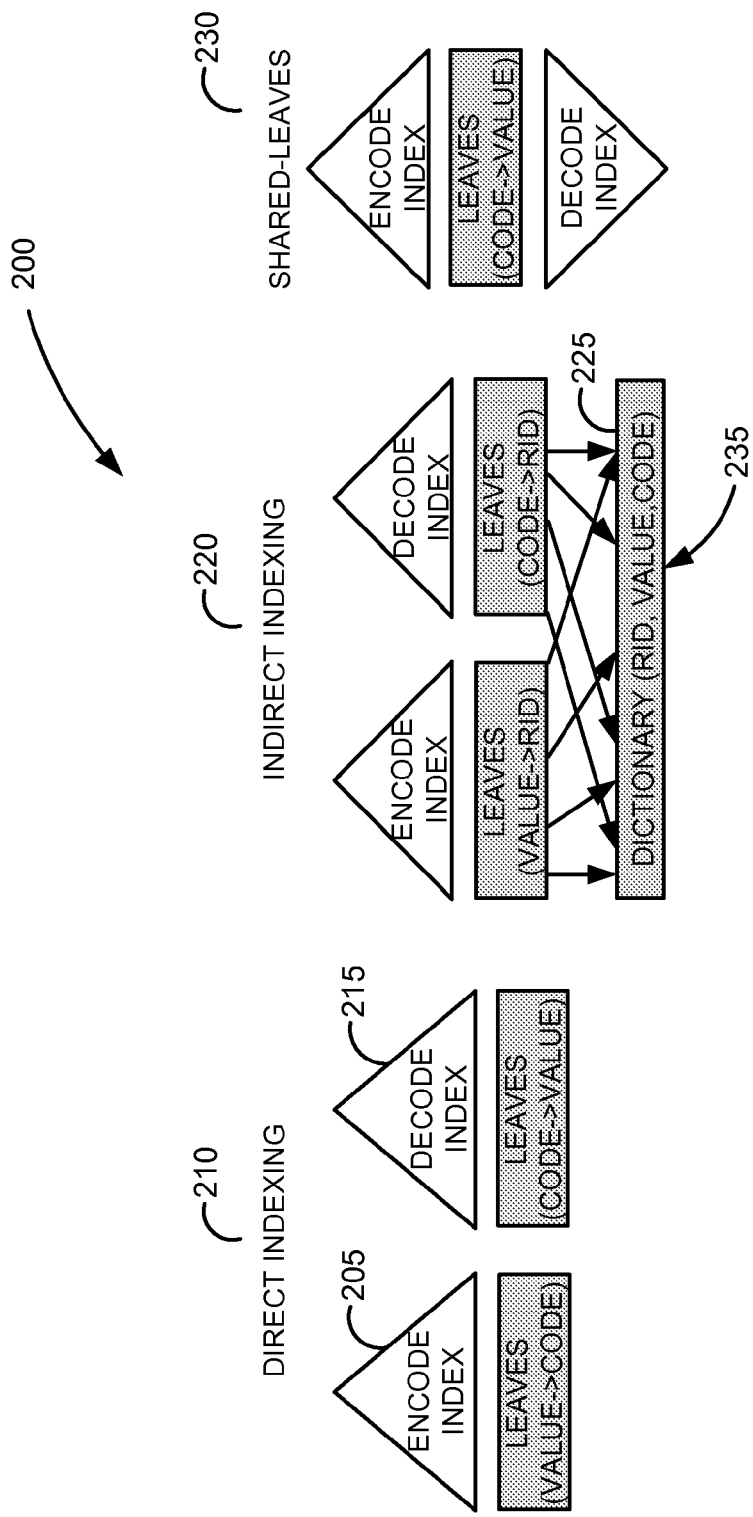
FIG. 2 is a diagram that shows a direct, an indirect, and a shared-leaves approach for indexing of the attributes of table T.

FIG. 2 is a diagram that shows a direct, an indirect, and a shared-leaves approach for indexing of the attributes of table T. Table T can support the above operations for encoding and decoding string values and to enable rewrite of the query predicates by building indexes for both attributes of the table T (value and code). In an embodiment, the indexing of the attributes value and code can be direct 210 or indirect 220. Structure 200 shows the direct 210, indirect 220, and shared-leaves 230 approach. In the direct approach 210, two indexes for encoding and decoding are created that hold the table data directly in their leaves (e.g., encode index 205 and decode index 215). The table does not need to be kept in the main memory since the data is stored in the indexes, but the table data is held redundantly in the two indexes, which wastes memory space. In the indirect approach 220, the encode index and decode index for encoding and decoding, such as encode index 205 and decode index 215, are created to hold only references to the table data 225 (e.g., using a row identifier "rid" 235). The table may be kept in main memory instead being written to an external drive. Although the indexes are smaller, the extra level of indirectness may result in higher cache miss-rates. In another embodiment, the two indexes for encoding and decoding share the same leaves (e.g., shared-leaves 230 approach), which hold the table data directly in their leaves but avoid the redundancy of the direct indexing 210 approach. Thus, the shared leaves also avoid the additional level of indirectness of the indirect indexing approach 220.

Since the string dictionary uses an order-preserving encoding scheme, the string values and the integer codes in table T follow the same sorting order. As both attribute values of table T can be kept in sorting order inside the leaves, the leaves can provide access paths for both lookup directions (i.e., for the encoding and decoding) using a standard search method for sorted data (e.g., binary search or interpolation search). Moreover, as is the case for direct indexes, using the shared-leaves for indexing the dictionary means that table T does not have to be kept explicitly in main memory because the leaves hold all the data of table T.

Figure 3:
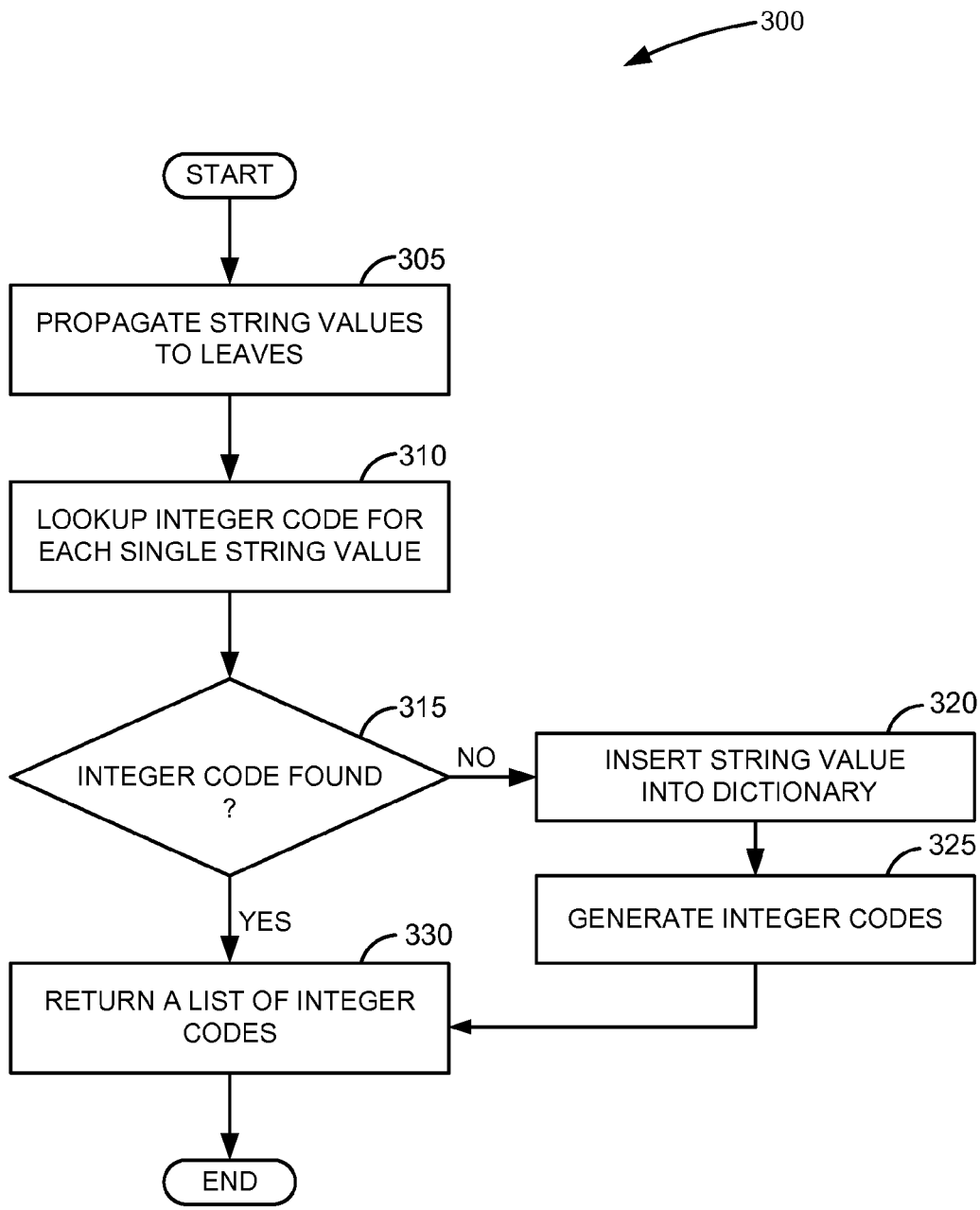
FIG. 3 is a flow diagram of an embodiment that shows how the shared leaves approach supports data loading and query processing inside a dictionary.
Figure 6:
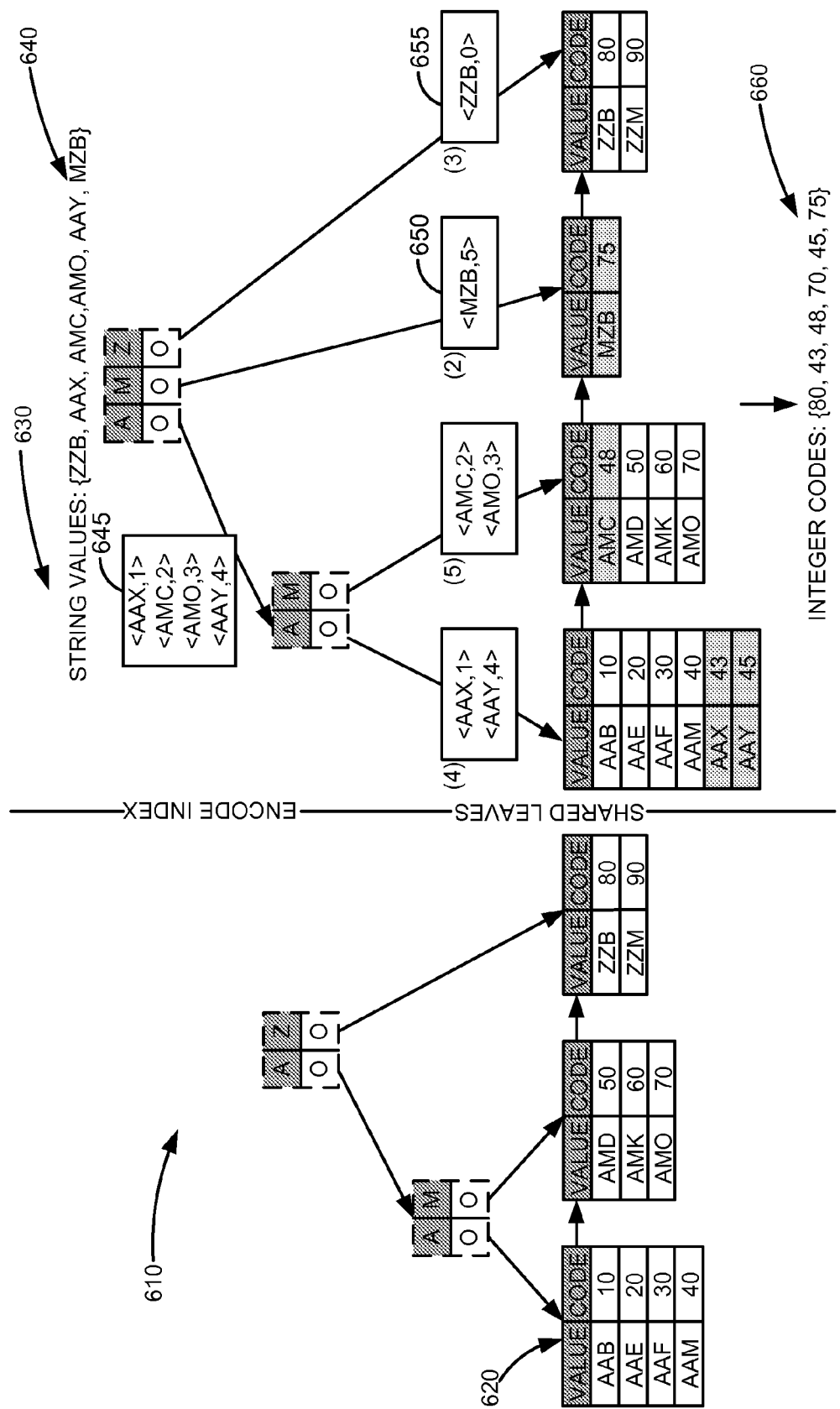
FIG. 6 is a diagram of an embodiment for encoding data using a CS array trie.
Figure 7:
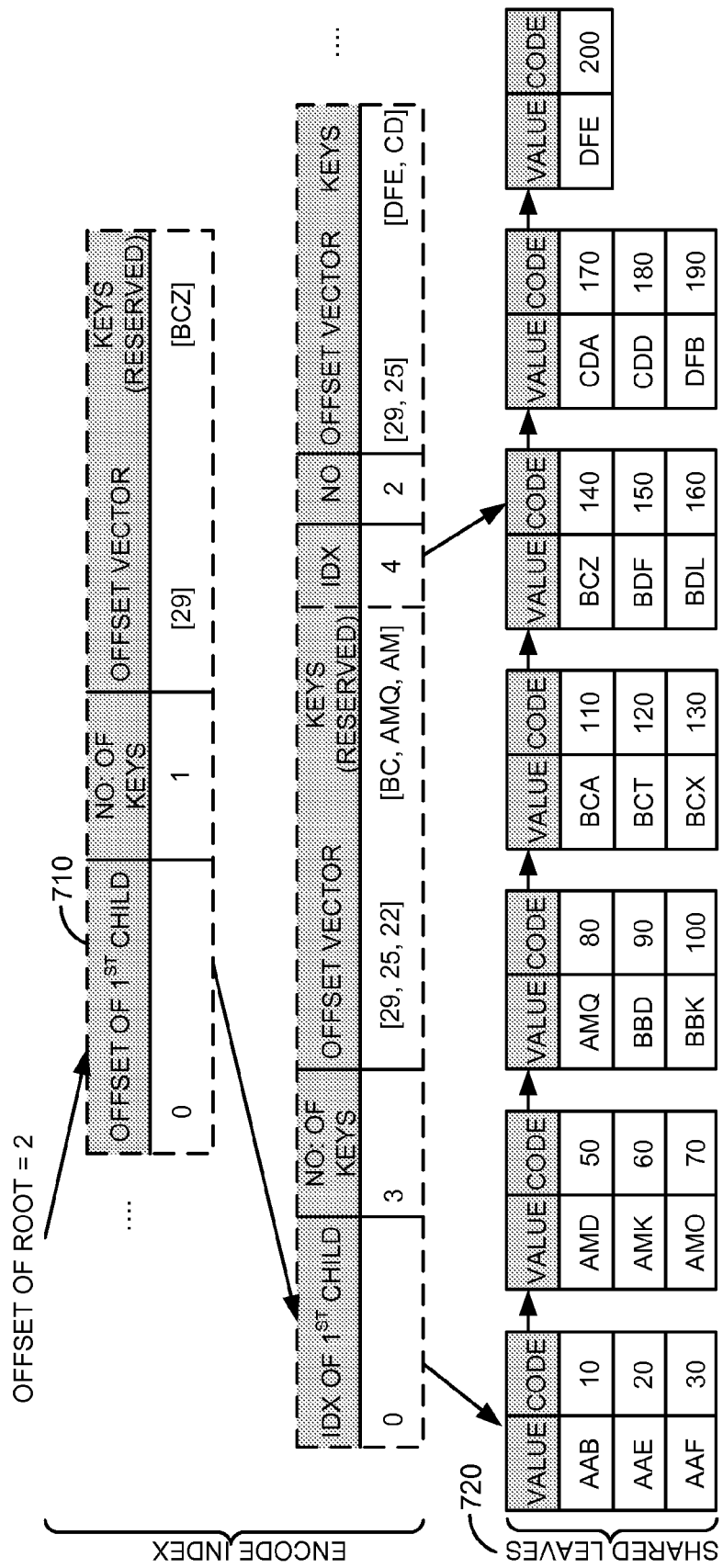
FIG. 7 is a diagram of an example of a CS prefix tree, according to an embodiment.

FIG. 3 is a flow diagram of an embodiment that shows the shared leaves approach for data loading and query processing inside a dictionary. An encode index may be used to encode a list of string values. At block 305 of process 300, the encode index propagates (e.g., broadcasts, passes along, etc.) the string values to the corresponding leaves (e.g., as shown in FIG. 6 or FIG. 7). At block 310, lookup of the integer code for each single string value is performed. In one embodiment, the lookup operation may be performed via a standard search algorithm inside a leaf. The decoding of a list of integer codes works similarly wherein the decode index propagates the integer codes down to the corresponding leaves. At decision block 315, the process checks if for each string value there is an integer code. If the corresponding integer codes for all string values are found, then the process continues at block 330. At block 330, a list of integer codes is returned by the lookup operation (i.e., a result list). If some integer codes for string values are not found by the lookup operation on the encode index, the process continues at block 320. At block 320, the string values for which there are no integer codes found are inserted into the dictionary by writing new rows in table T. New integer codes are generated for these string values, at block 325. The code range for insertion of new string values is partitioned into equidistant intervals. The limits of the intervals represent the new codes. If the range is smaller than the number of new string values to be inserted, some string values are recoded and the data using them is updated. The newly generated integer codes are added to the list of codes returned by the lookup operation at block 315. The indexes are updated if necessary.

In an embodiment, the shared leaves also support rewriting predicates inside a dictionary. For rewriting equality and range predicates, the encode index propagates the string values to the corresponding leaves and a search operation on the leaves returns the integer codes. For rewriting prefix predicates, the encode index propagates the prefix to the leaves containing the minimal and maximal string values for the prefix; the leaves map the minimal and maximal strings to the integer codes.

The data structures of the dictionary (i.e., leaves and indexes) are optimized for encoding or decoding bulks and are cache-aware. The operations, encoding and decoding, are easy to parallelize. The leaf structure differs from the index structure. All structures, leaf structures and index structures, reside in memory. The leaf structure holds the string values and the integer codes in sorting order. A leaf supports the encoding of variable-length string values and supports efficient bulk loads and bulk updates. The indexes for encoding and decoding keep the keys in sort order for efficient lookup over the sorted leaves. The encode index provides propagation of string constants and string prefixes to the leaves.

In addition to the lookup of the integer codes for string values that are already a part of the dictionary, it might be necessary to insert new string values into the dictionary (e.g., update the leaves as well as the both indexes for encoding and decoding) and generate new order-preserving codes for these values. In an embodiment, the lookup and insert operations are combined into one operation. The following strategies can support this approach: all-bulked that updates the encode and decode indexes after generation of any new integer codes and hybrid approach that updates the encode index during propagation of the string values.

Figure 4:
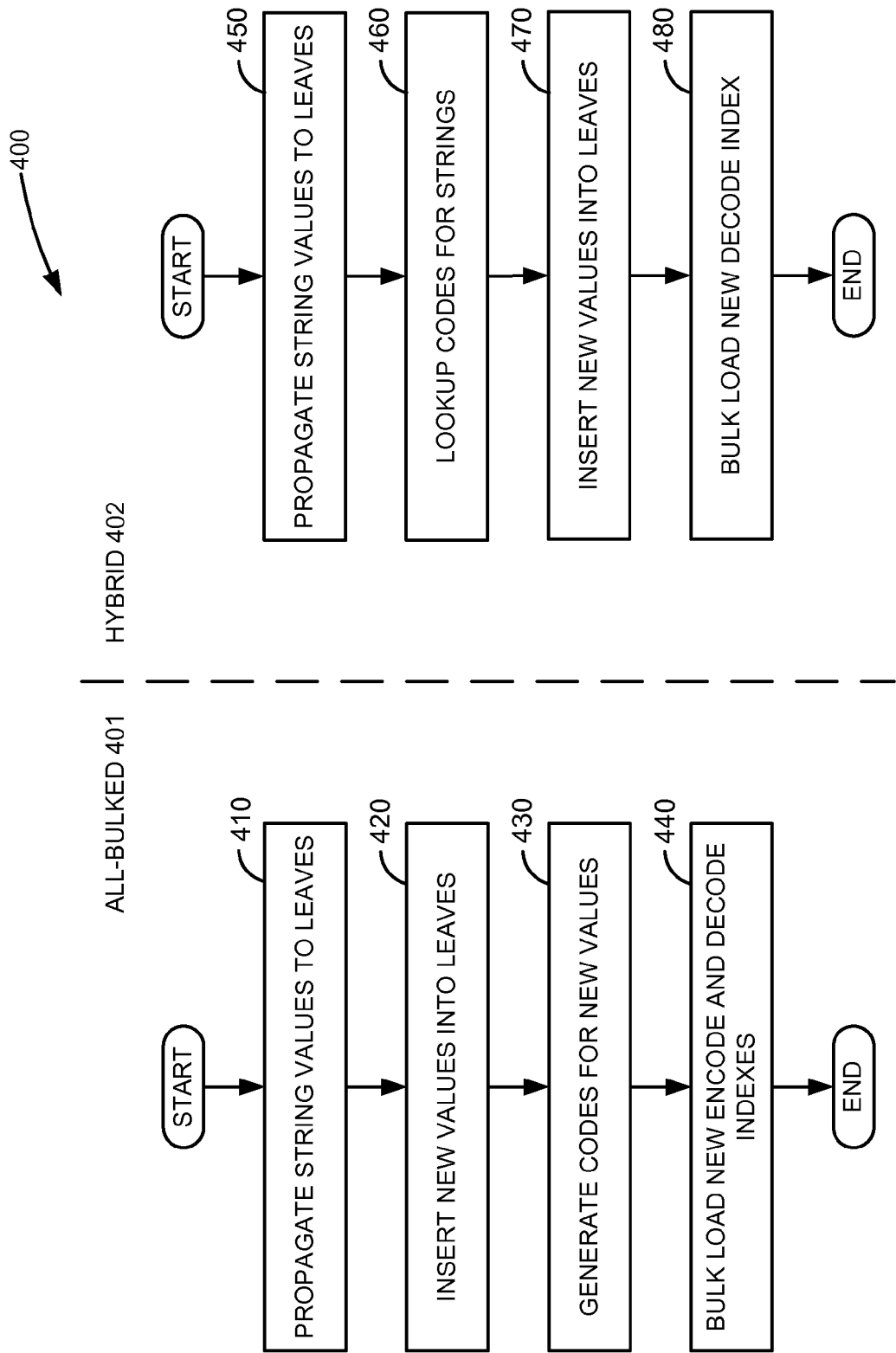
FIG. 4 is a diagram of an embodiment that shows the all-bulked and hybrid strategies.

FIG. 4 is a diagram of an embodiment that shows the all-bulked and hybrid strategies. Process 400 shows the main steps of the all-bulked 401 strategy and the hybrid 402 strategy. All-bulked 401 strategy begins at block 410. At block 410, the string values are propagated to the corresponding leaves using an encode index. The integer codes for the string values in the leaves are looked up. At block 420, any new string values are inserted into the leaves. The leaf level is reorganized in response to the inserted new values (e.g., a leaf level is created where all leaves are filled up to the maximal leaf size). At block 430, integer codes for the new values are generated. At block 440, a new encode index and a new decode index are bulk loaded from the updated leaf level. Hybrid 402 strategy includes the following steps. At block 450, the string values are propagated to the corresponding leaves using an encode index. The encode index is updated directly, during propagation of the string values. At block 460, the integer codes for the string values in the leaves are looked up. At block 470, any new string values are inserted into the leaves. Integer codes for the new values are generated. At block 480, a new decode index is bulk loaded from the updated leaf level. To ensure data consistency, the indexes and the leaves are locked during data loading. For query processing, read-only concurrency may be allowed. During data loading, updated leaves may be written sequentially to a storage unit.

Figure 5:
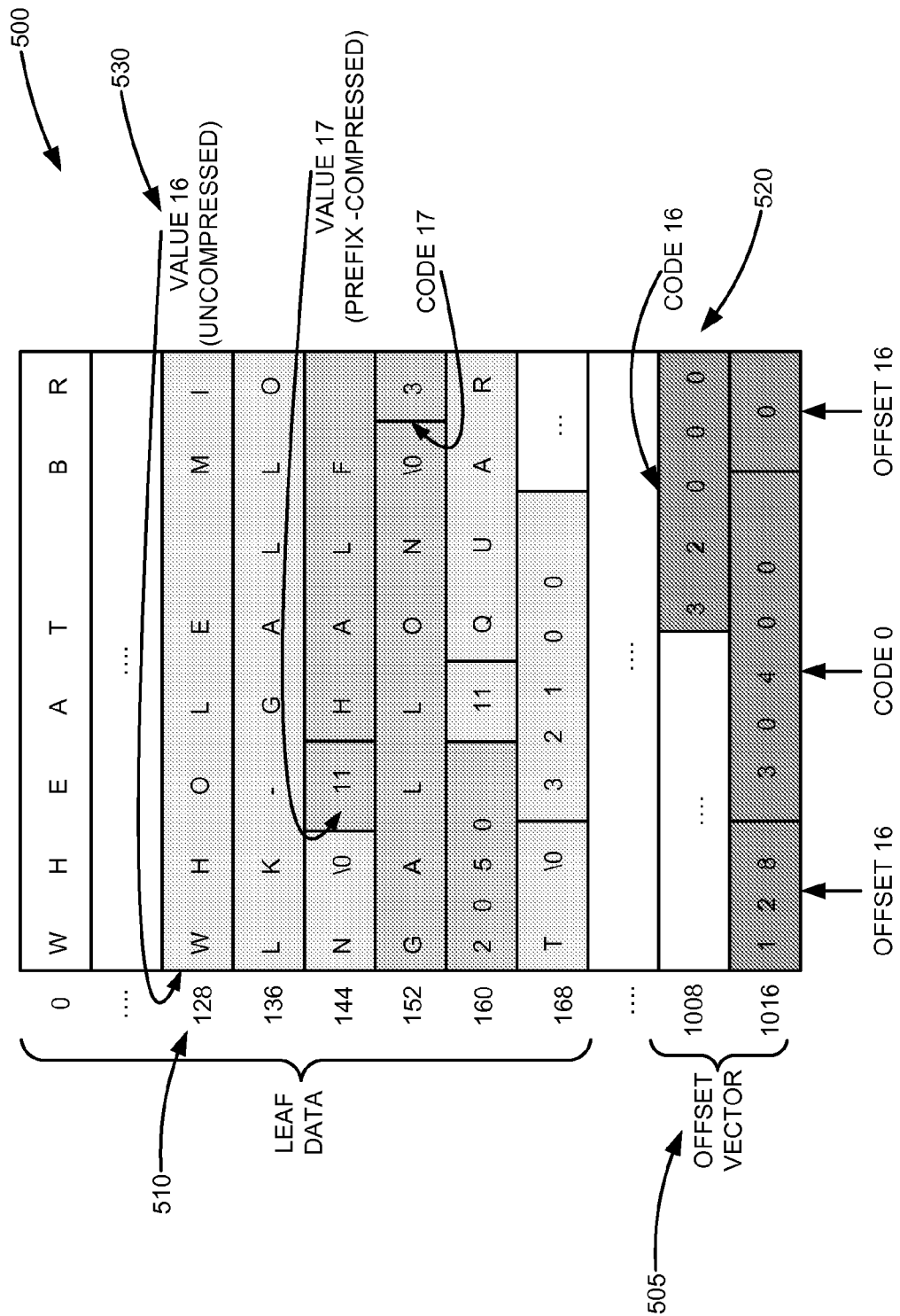
FIG. 5 is an example of a memory layout of a leaf structure for variable-length string values, according to an embodiment of the invention.

FIG. 5 is an example of a memory layout of a leaf structure for variable-length string values, according to an embodiment of the invention. Leaf structure 500 may be used in the shared-leaves approach 230 for encoding and decoding variable-length string values on a particular platform. The leaf structure 500 keeps string values as well as their corresponding fixed-length integer codes sorted and compressed together in one chunk of memory to increase the cache locality during data loading and lookup operations. For a lookup using this leaf structure 500, an offset vector 505 is stored at the end of the leaf that holds references (i.e., offsets) and the integer codes for all uncompressed strings of a leaf also in a sorted way. For example, offset 128 at 510 and code 32000 at 520 are stored in the offset vector 505 for value 16 at 530. The integer codes of the compressed string values are stored together with the compressed string values in the data section and not in the offset vector 505 (e.g., code 32050 for value 17).

During leaf structure data loading, the string values are first compressed and then written into the leaf together with their codes in a forward way (e.g., starting from memory position 0 and incrementing the position for each new entry). To enable searching for string values inside a leaf includes, each n-th string (e.g., each third string) is stored in an uncompressed way and the positions of the uncompressed strings are saved as anchors at the end of a leaf (to be found during search). However, when loading data into a leaf, the exact size of the compressed string values may be unknown before all data is written into the leaf. Thus, the offset vector 505 may be stored from the last memory position in a reverse way by decrementing the position for each new anchor.

For bulk lookup, the leaf structure supports one lookup operation to look up the integer code for a given string value and another to look up the string value for a given code. To look up the code for a given string value, an algorithm may be performed for sequential search over the incrementally encoded values that does not require decompression of the leaf data. In an embodiment, the algorithm may be as described with reference to table 1 below.

TABLE 1

Sequential search of string v on compressed leaf
Algorithm 1: Sequential search of string v on compressed leaf

```
function SEQUENTIALSEARCH(leaf, start, end, v)
  v' leaf[start]                --- read string v' at offset start
  start start + size(v')        --- increment offest by string size
  prefix_len prefix_len(v, v')  --- calculate common prefix len
```

TABLE 1-continued

Sequential search of string v on compressed leaf
Algorithm 1: Sequential search of string v on compressed leaf

```
while start __end and prefix__len < |v| do
    curr__prefix__len  leaf[start]      --- get curr. prefix len
    start  start + p                    --- increment offest by prefix-size p = 1
    v'  leaf[start]
    start  start + size(v')
    if curr__prefix__len < > prefix__len then
        continue                        --- prefix of curr. value v' too short/long
    else if compare(v', v) > 0
    then
        return −1                       --- curr. value v' comes after search value v
    end if
    prefix__len  prefix__len + prefix__len(v, v')
    start  start + c                    --- increment offest by code-size c = 4
end while
if prefix__len = |v| then
    return leaf[start − c]              --- string v found: return code
else
    return −1                           --- string v not found
end if
end function
```

The values are incrementally decompressed during the sequential search when looking up a value for a given code. For bulk lookup, the lookup probe is sorted to reduce the search overhead. For the initial bulk load of a leaf with a list of string values, the string values are sorted first. Then, the leaf data is written sequentially from the beginning of the leaf and the offset vector is written in reverse order from the end. If the string values do not occupy all the memory allocated for them, the offset vector is moved forward and the unused memory released. For bulk update, a list of new string values is first sorted and then inserted into an existing leaf. Then, a sort merge of the new string values and the existing leaf is performed to create a new leaf.

In an embodiment, a cache-conscious index structure may be used on top of the leaf structure for encoding and decoding. These indexes support the all-bulked 401 and hybrid 402 strategies. For the encoding index, a cache-sensitive (CS) version of the Patricia trie, the CS array trie, that supports the hybrid strategy 402 is defined. The Patricia trie, or radix tree, is a specialized set data structure based on the trie (a prefix tree that is an ordered tree data structure used to store associative array where the keys are usually strings) that is used to store a set of stings. In contrast with a regular trie, the edges of a Patricia trie are labeled with sequences of characters rather than with single characters. These can be strings of characters, bit strings such as integers or IP addresses, or generally arbitrary sequences of objects in lexicographical order. In addition, a new cache-sensitive version of the prefix B-tree (a tree data structure that keeps data sorted and is optimized for systems that read and write large bulks of data), the CS prefix tree, to support the all-bulked 401 update strategy is defined. As decoding index, a CS search (CSS) tree may be used. The CSS tree may be created over the leaves of the dictionary using the minimal integer codes of each leaf as keys of the index. The CSS tree can be bulk loaded efficiently bottom-up from the leaves of the dictionary. A CS array trie may be used as an encode index to propagate string lookup probes and updates to the leaves. The CS array trie uses read-optimized cache-aware data structures for the index nodes and does not decompose the strings completely.

FIG. 6 is a diagram of an embodiment for encoding data using a CS array trie. A CS array trie 610 node uses an array instead of a linked list to store the characters of the indexed string values. When sequentially inserting single values into a trie, an array is less efficient than a linked list. But for each bulk insert of new values into an array trie, the array of a node is expanded only once. For lookup of a string value of a CS array trie 610, a search over the characters of a node may be performed, where the array supports binary search and all characters are stored clustered in memory. The CS array trie 610 stores a set of strings that have the same prefix together using the leaf structure. For example, leaf 620 includes a set of strings that have the same "aa" prefix. The CS array trie leaf 610 stores the complete strings to enable efficient decoding of integer codes using the same leaves. The strings are compressed using incremental encoding.

In an embodiment, the CS array trie may be used to implement the hybrid update strategy 402 for bulk encoding of string values during data loading 110, as shown at 630. The string values 640 are propagated (in preorder) to the leaves using variable buffers (e.g., buffers 645, 650, and 655) at each trie node to increase cache locality for lookup. Using buffers at each node, the array of characters stored at a node grow only once per bulk. This reduces cache misses. To estimate the expected leaf size, the uncompressed size of all new strings can be added in a buffer page as well as the size of their new codes (without eliminating duplicates) to the current leaf size. When all string values 640 are propagated to their leaves, new integer codes 660 are generated for the new string values by analyzing the number of strings inserted between existing string values 640.

The CS array trie supports efficient predicate rewrite. For equality and range predicates, the constants are propagated through the trie without buffering. For prefix predicates, the prefix is used to find the minimal and maximal string values that match it. Propagation of string values from the root of the trie to the leaves is parallelized. New integer codes are generated in parallel, without locking any data structures, by determining which leaves hold contiguous new string values. Lookup of the new string values can also be parallelized without locking any data structures.

FIG. 7 is a diagram of an example of a CS prefix tree, according to an embodiment. In an embodiment, a CS prefix tree can be used as an encode index to propagate string lookup probes and updates. A CS prefix tree node contains the shortest prefixes that enable the propagation of string values to the child nodes. Instead of storing a pointer to each child, the CS prefix tree allocates a contiguous block of memory for nodes and uses offsets to navigate through the block. This reduces memory consumption and prevents performance problems due to pointer chasing. To reduce the memory footprint of the tree further, only the offset to the first child node 710 is stored explicitly. With nodes of fixed size, offset arithmetic may be used to calculate the offset to a child node. To enable fast search over the variable-length keys of a node, the offsets to the keys are stored in an offset vector at the beginning of each node. The node size (s) is fixed to allow use of offset arithmetic for computing the index (i) to the child nodes. For example, the i-th child of a node can be found at offset o=offset (first_child)+(i*s). The number of children of a node is variable because variable-length keys are stored at a node.

The CS prefix tree can only be bulk loaded bottom-up, so it is mainly suitable for the all-bulked update strategy 401. To encode the first bulk load of string values, the string values are used to build the complete leaf level. A CS array trie may be used to partition the string values into buckets sorted using multi-key quick-sort. Then, the sorted string values are used to create and fill in leaves 720 to the maximum leaf size. From these leaves 720, a new encode index is bulk loaded bottom-up.

Figure 8:
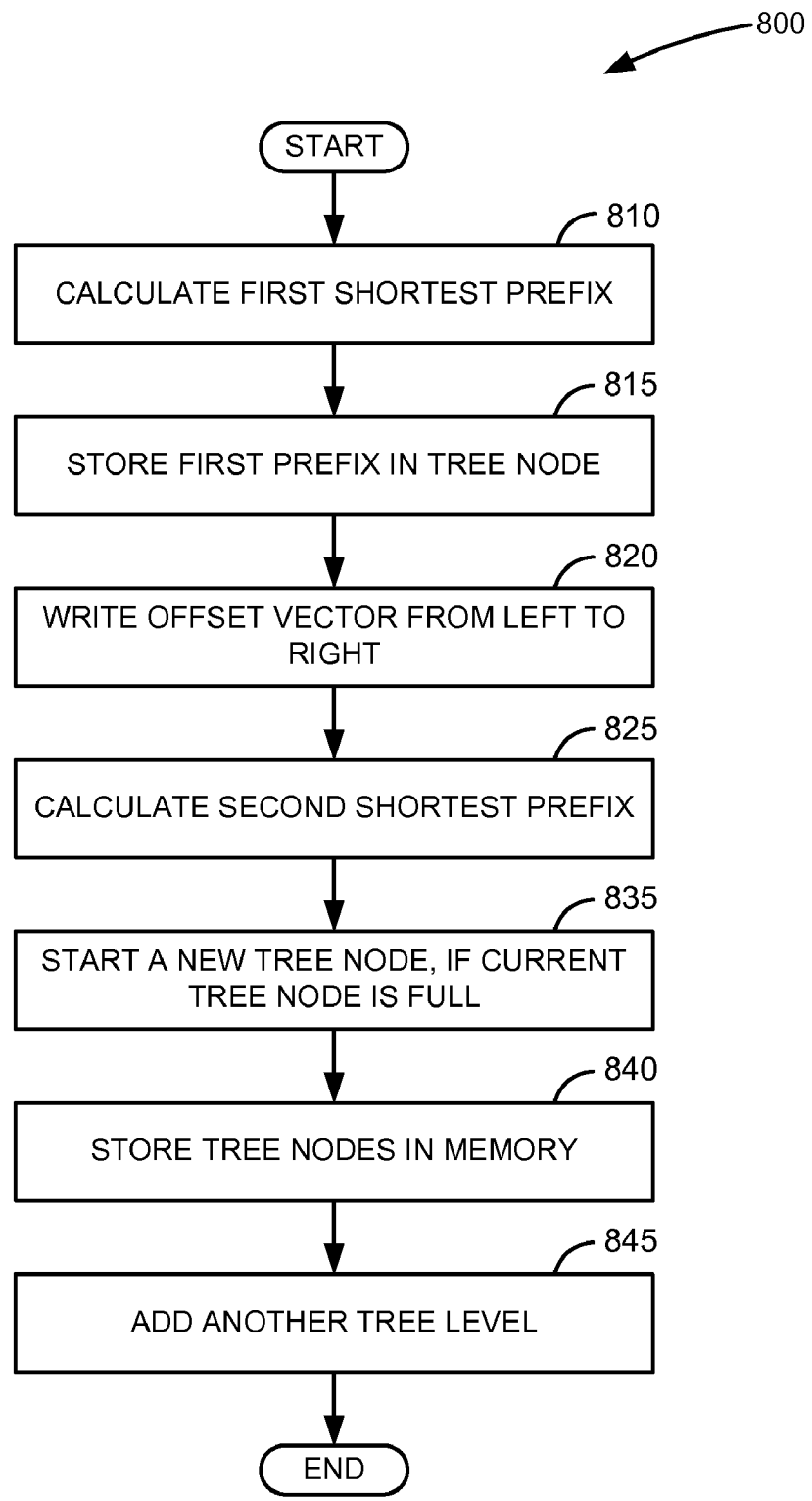
FIG. 8 is a flow diagram of an embodiment of a bulk load procedure of a CS prefix tree from a given leaf level.

FIG. 8 is a flow diagram of an embodiment of a bulk load procedure of a CS prefix tree from a given leaf level. At block 810, starting with the first two leaves, a first shortest prefix is calculated. The first shortest prefix to distinguish the largest value of the first leaf and the smallest value of the second leaf. At block 815, the first shortest prefix is stored in a node of the tree. Because an offset into the leaf level can be calculated, a pointer to each child is not stored. At block 820, an offset vector is written from left to right and the keys are stored from right to left (since the size of the offset vector is unknown). At block 825, a second shortest prefix is calculated. The second shortest prefix to distinguish the largest value of the second leaf and the smallest value of the third leaf, and so on until all leaves are processed. At block 835, a new node of the tree is started if the current tree node is full. The index is stored to the first leaf that will be a child of this new node as an anchor. At block 840, the nodes are stored contiguously in a memory storage unit. At block 845, as long as more than one node is created for a given level of the tree, another level is added on top of existing tree levels. The new level includes a node storing prefixes distinguishing the child nodes. This node is the root of the tree. The offset is stored to this node in the next memory block. Because the tree is built bottom-up, the nodes are stored in that sequence in memory.

For subsequent bulk loads, the existing CS prefix tree may be used to propagate the string values to the leaves. The string values are buffered at leaf level and then the existing leaf is sort-merged with the new string values stored in the buffers. If the new string values in the buffers and the values of the existing leaf do not fit into one leaf, another leaf may be created. Query predicates can be rewritten using the CS prefix tree. For an equality predicate or a range predicate, a simple lookup can be performed with the string constants. For a prefix predicate, the prefix can be used to find the minimal string value that matches the prefix. The lookup for the prefix finds a leaf containing the value even if the value is not in the dictionary. From that leaf on, a sequential search can be executed for the maximum string value matching the prefix.

Memory may be allocated in advance in contiguous blocks. The maximum amount of memory that all the tree nodes need can be calculated by setting an arbitrary limit on the maximum length of the keys in the tree. Then, the minimum number of keys that fit in one node is calculated and hence the maximal number of nodes needed to store the data. Using a mix of pointers and offset arithmetic identifies the correct child and thus allows use of multiple blocks of memory. A CS prefix tree may be more expensive to build than a CS array trie because the data is first sorted and then loaded bottom-up. But the CS prefix tree performs better than the CS array trie for lookup workloads.

Figure 9:
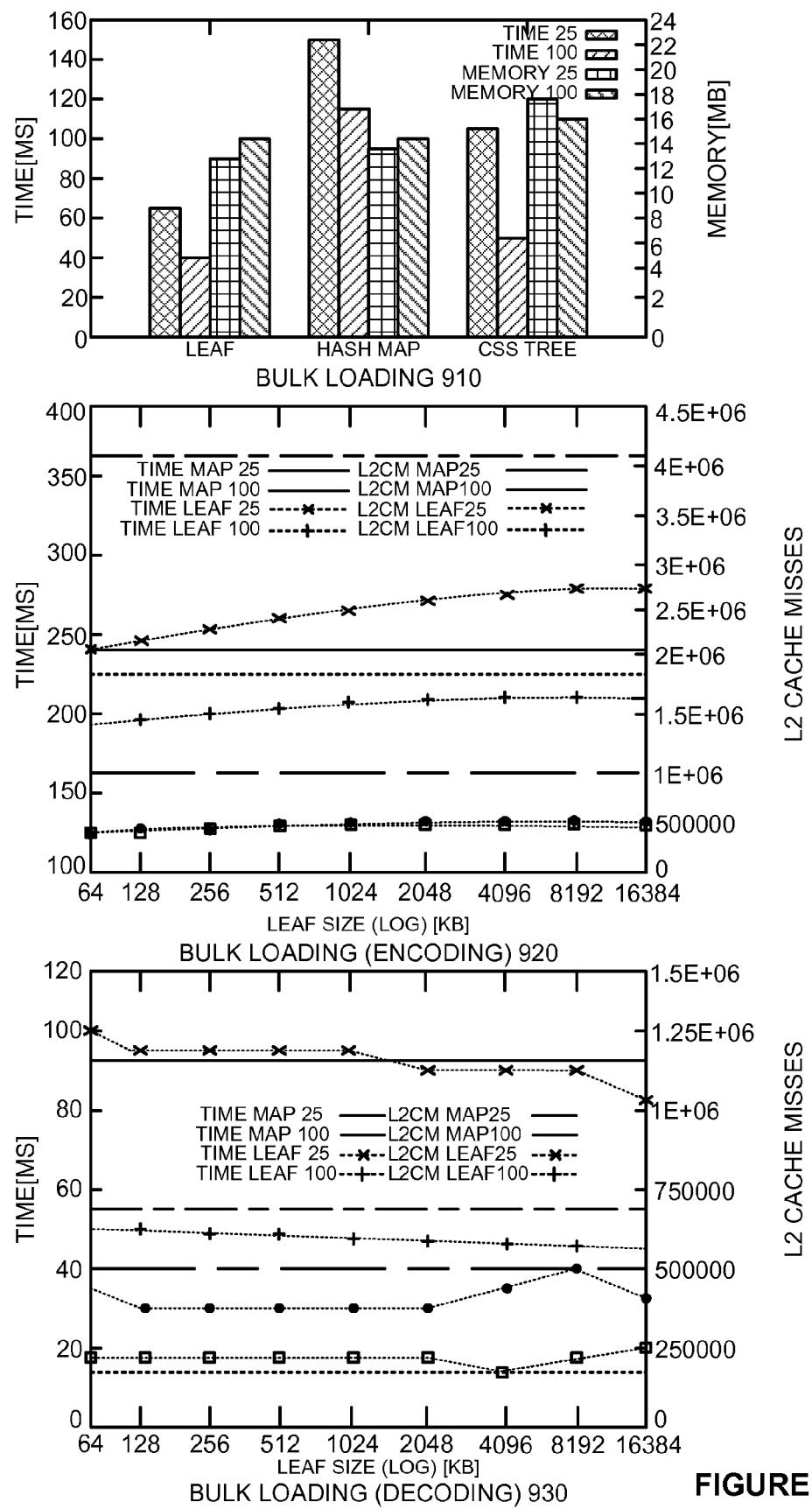
FIG. 9 is a diagram of results from an experiment that shows performance and memory overhead of the leaf structure, according to an embodiment.

FIG. 9 is a diagram of results from an experiment that shows performance and memory overhead of the leaf structure, according to an embodiment. The experiment includes two workloads so that each fit into a leaf of size 16 MB. The workloads use different fixed string lengths and thus represent different numbers of strings. The workloads are distinct unsorted (without skew) to represent the worst case for lookup operations. A workload is loaded onto a set of leaves holding the data in sort order. The used leaf sizes vary from 64 KB to 16 MB. The costs of the different workloads with different leaf sizes are measured without the overhead of an encoding and decoding index. Also, the execution time and cache misses when bulk loading the leaves 910 and executing lookups for encoding 920 and decoding 930 are measured. To load the leaves, first the workloads are sorted and each leaf is bulk loaded up to its maximal size, then the integer codes are generated for the leaves. Size of 8 bytes is used for the integer code to find the expected memory consumption for encoding attributes with a large domain size. To measure the lookup performance of the leaf structures, each string value of the workloads is assigned to a leaf using a buffer and then the code for each string is looked up in the individual buffers. Finally, the encoded workload is used to execute the lookup for decoding the integer codes again.

In the experiment, a 16 MB leaf structure is compared to two cache-sensitive read-optimized index structures using two different workloads. For encoding the string values, the leaf structure is compared to a compact-chain hash table (i.e., bulk lookup 920). For decoding integer codes, the leaf structure is compared to a CSS tree (i.e., bulk lookup 930). The result shows that the optimal leaf structure size is about 512 KB (medium) and the performance of the leaf structure is comparable to read-optimized index structures yet uses less memory.

Figure 10:
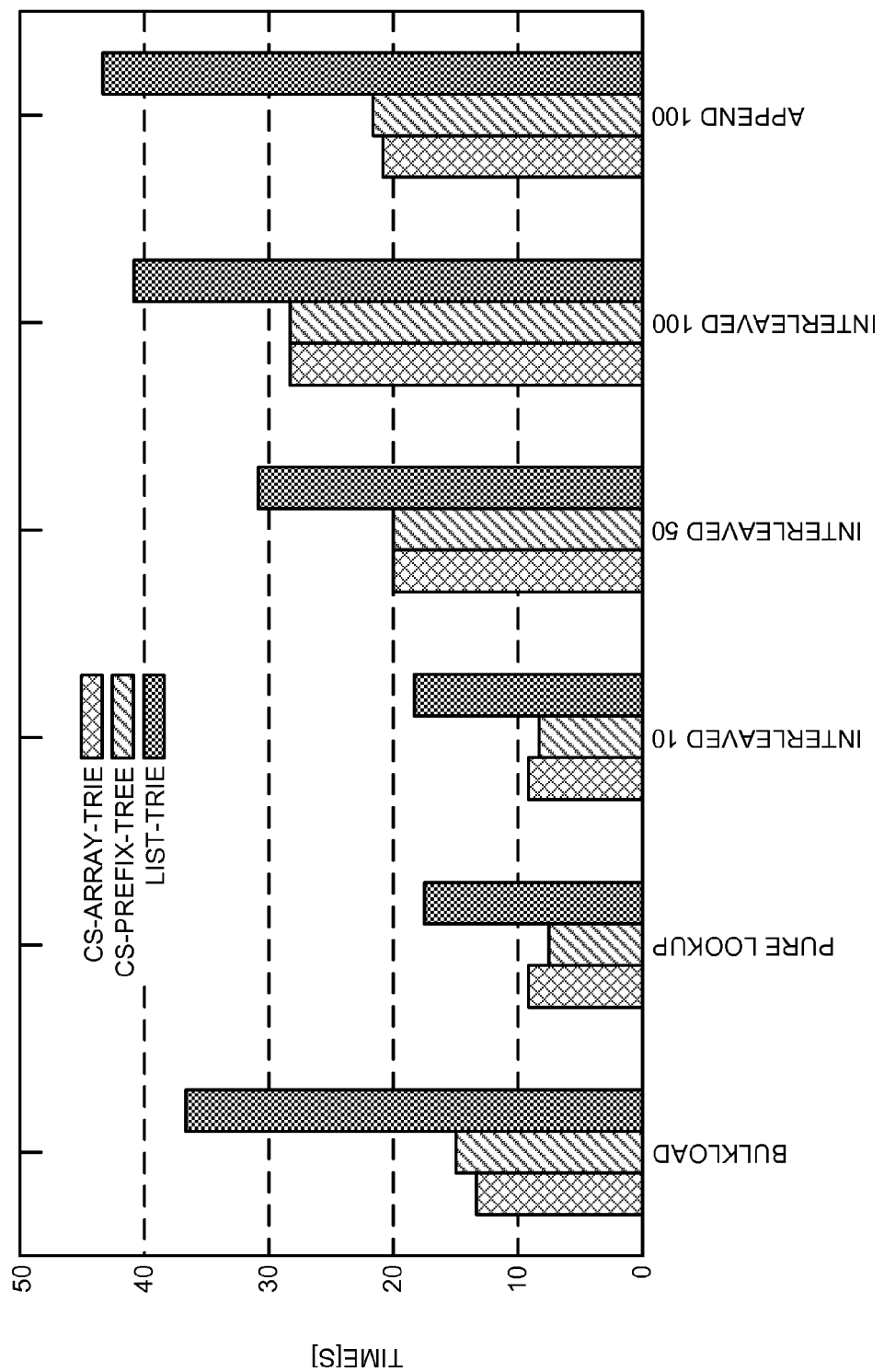
FIG. 10 is a diagram of results from an experiment that shows lookup and update costs of encoding indexes, according to an embodiment.

FIG. 10 is a diagram of results from an experiment that shows lookup and update costs of encoding indexes, according to an embodiment. The costs for encoding workloads that produce different update patterns on the indexes are measured. First, a dictionary with 10 million strings is bulk loaded (Bulk 1) and then another bulk load (Bulk 2) of 10 million strings representing a certain update pattern is encoded. All workloads consist of string values with a fixed length of 20 characters. The maximum leaf size is set at 512 KB. In the experiment, five different update patterns are used. 1) No-updates: Bulk 2 contains no new strings; 2) Interleaved 10: Bulk 2 contains 10% new string values where each tenth string in sort order is new; 3) Interleaved 50: Bulk 2 contains 50% new string values where every other string in sort order is new; 4) Interleaved 100: Bulk 2 contains 100% new string values, each inserted between two values of Bulk 1; and 5) Append: Bulk 2 contains 100% new string values, all inserted after the last string of Bulk 1. The experiment shows that the times for loading Bulk 1 and then Bulk 2 for the different update patterns were similar for CS array tries and CS prefix trees but much longer for list trie.

Figure 11:
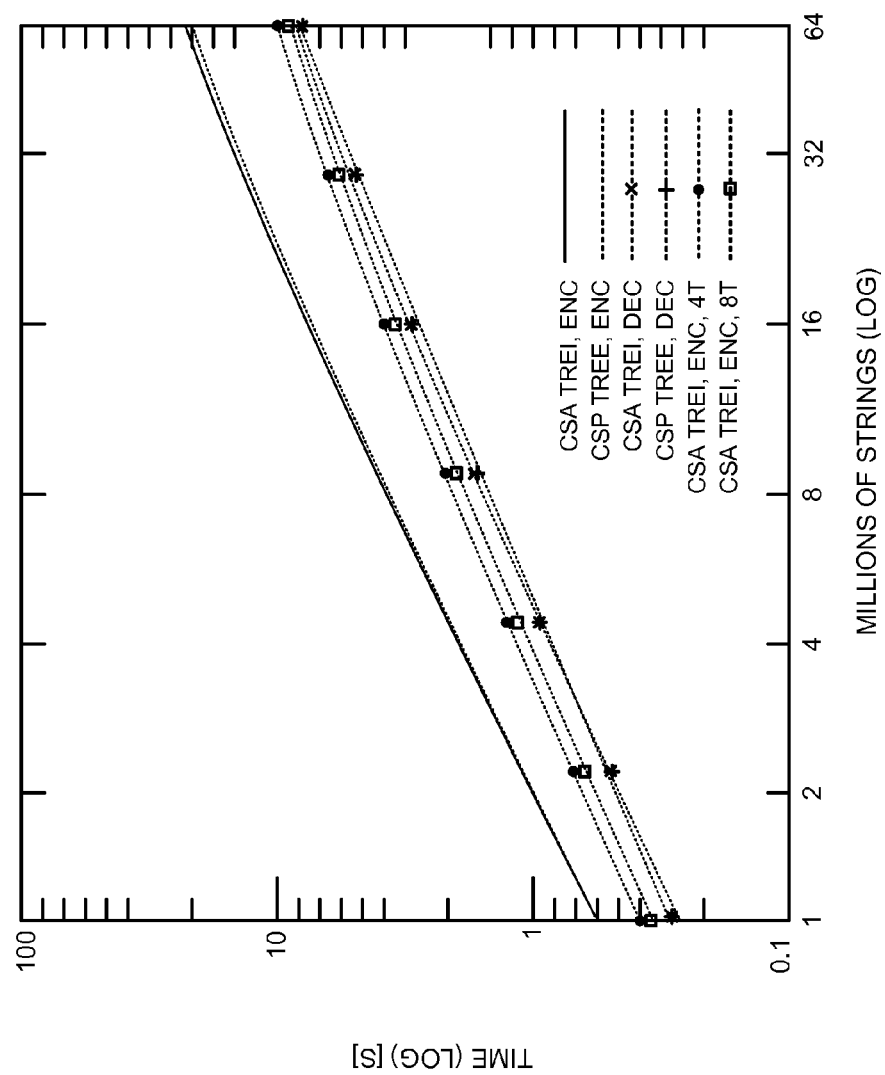
FIG. 11 is a diagram of results from an experiment that shows scalability of the dictionary, according to an embodiment.

FIG. 11 is a diagram of results from an experiment that shows scalability of the dictionary, according to an embodiment. The experiment tests the performance of the data structures for unsorted workloads of different sizes. The results show that the times required to encode the workloads using different encoding indexes for the dictionary showed linear scaling with the number of strings in the workload. After encoding, a decode index is bulk loaded from the leaves of the encoding indexes and the encoded workloads are decoded. Again, the times showed linear scaling. To check the effects of parallelization on the CS array trie, the number of threads was varied and the results show that performance with 8 threads was better than with 16 threads due to the overhead for thread synchronization.

Lightweight compression schemes can improve the query processing performance of column-oriented database systems. In one such scheme, a dictionary replaces long (variable-length) values with shorter (fixed-length) integer codes. To improve performance further, column stores can use order-preserving compression schemes. New data structures may be used to support order-preserving dictionary compression for variable-length string attributes with a large domain size that can change over time. A dictionary can be modeled as a table mapping string values to arbitrary integer codes. A new indexing approach may be used for efficient access to such a dictionary using compressed index data. The data structures are at least as fast as other data structures for dictionaries but occupy less memory.

Figure 12:
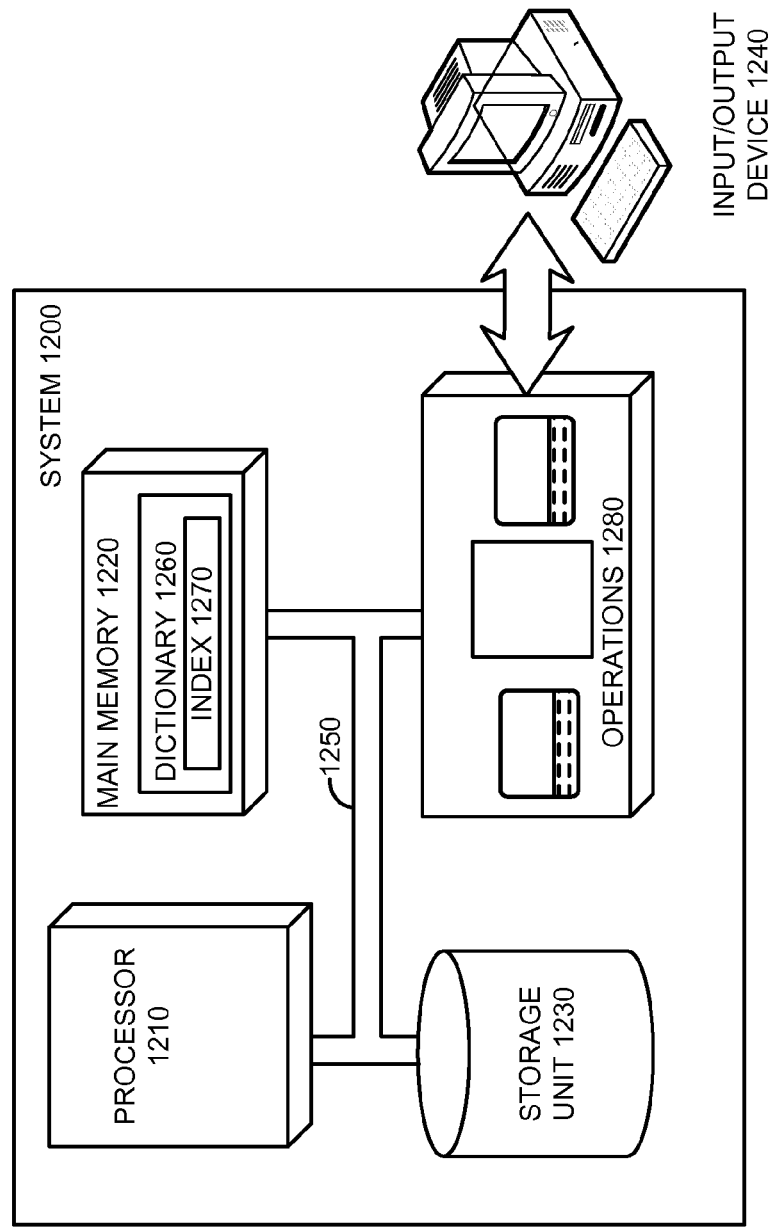
FIG. 12 is a schematic diagram of an example of a computer system, according to an embodiment of the invention.

FIG. 12 is a schematic diagram of an example of a computer system, according to an embodiment of the invention. System 1200 can be used for the operations described in association with the FIG. 3 according to one implementation. System 1200 includes a processor 1210, a main memory 1220, a storage unit 1230, and an input/output device 1240. Each of the components 1210, 1220, 1230, and 1240 are interconnected using a system bus 1250.

The processor 1210 is capable of processing instructions for execution within the system 1200. The processor is in communication with the main memory store 1220. Further, the processor is operable to execute operations 1280 stored in the main memory 1220, such as data loading 110, query compilation 120, and query execution 130. In one embodiment, the processor 1210 is a single-threaded processor. In another embodiment, the processor 1210 is a multi-threaded processor. The processor 1210 is capable of processing instructions stored either in main memory 1220 or on the storage device 1230, to display graphical information for a user interface on the input/output device 1240.

The main memory 1220 stores information within the system 1200. In one implementation, the main memory 1220 is a machine-readable medium. In an embodiment, the main memory 1220 stores order-preserved compressed data in a column-oriented format. Main memory 1220 stores a dictionary 1260. Dictionary 1260 is used for encoding and decoding of the compressed data, as represented by index 1270. The encode index and decode index contain shared-leaves data structures that hold data in sorted order in their leaves.

The storage device 1230 is capable of providing mass storage for the system 1200. In one implementation, the storage device 1230 is a computer-readable medium. In alternative embodiments, the storage device 1230 may be a floppy disk device, a hard disk device, an optical disk device, or a tape device.

The input/output device 1240 is used to trigger or initiate input/output operations 1280 for the system 1200. In one implementation, the input/output device 1240 includes a keyboard and/or pointing device. In another implementation, input/output device 1240 includes a display unit for displaying graphical user interfaces.

Elements of embodiments may also be provided as a tangible machine-readable medium (e.g., computer-readable medium) for tangibly storing the machine-executable instructions. The tangible machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program, which may be transferred from a remote computer (e.g., a server) to a requesting computer (e.g., a client) via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A machine-readable storage medium tangibly storing machine-readable instructions thereon, which when executed by a machine, cause the machine to perform operations comprising:
   propagating a plurality of string values to a compressed leaf data of a shared-leaves structure of a dictionary via an encode index;
   obtaining a plurality of order-preserving integer codes for the plurality of string values via an lookup operation;
   if a subset of the plurality of order-preserving integer codes was not found during the obtaining, inserting a subset of the plurality of string values for which the subset of the plurality of order-preserving integer codes was not found into the shared-leaves structure;
   generating the subset of the plurality of order-preserving integer codes for a corresponding subset of the plurality of string values; and
   providing a list of the plurality of order-preserving integer codes, the list including the generated subset of the plurality of order-preserving integer codes.

2. The machine-readable storage medium of claim 1 wherein the operations further comprise:
   propagating the plurality of order-preserving integer codes to the shared-leaves structure of the dictionary via a decode index; and
   updating the encode index and the decode index.

3. The machine-readable storage medium of claim 1, wherein the operations further comprise:
   rewriting a string value from the plurality of string values in an equality-predicate or in a range-predicate with a corresponding integer code from the plurality of order-preserving integer codes; and
   rewriting a string prefix of a prefix-predicate with corresponding integer code ranges from the plurality of order-preserving integer codes.

4. The machine-readable storage medium of claim 1, wherein obtaining the plurality of order-preserving integer codes further comprises executing a sequential search operation over the compressed leaf data without decompression of the compressed leaf data.

5. The machine-readable storage medium of claim 1, wherein the encode index comprise a cache-sensitive array trie index or a cache-sensitive prefix trie index.

6. The machine-readable storage medium of claim 5, wherein the cache-sensitive array trie index comprises:
   storing the plurality of string values in a decode index array;
   propagating in preorder the plurality of string values to the shared-leaves structure via variable buffers at each cache-sensitive array trie node to populate the decode index array only once per bulk; and
   generating the subset of the plurality of order-preserving integer codes for the corresponding subset of the plurality of string values in parallel.

7. The machine-readable storage medium of claim 5, wherein the cache-sensitive prefix trie comprises:
   calculating a first shortest prefix to distinguish a largest value of a first leaf and a smallest value of a second leaf of the cache-sensitive prefix trie;

calculating a second shortest prefix to distinguish the largest value of the second leaf and the smallest value of a third leaf;

if there is more than one node in a level of the cache-sensitive prefix trie, adding a second level on top with a node storing the calculated first shortest prefix and second shortest prefix, wherein the node is a root of the cache-sensitive prefix trie.

8. A computer implemented method comprising a plurality of operations performed on a computer or a machine, the operations including:

propagating a plurality of string values to compressed leaf data of a shared-leaves structure of a dictionary via an encode index;

obtaining a plurality of order-preserving integer codes for the plurality of string values via an lookup operation;

if a subset of the plurality of order-preserving integer codes was not found during obtaining, inserting a subset of the plurality of string values for which the subset of the plurality of order-preserving integer codes was not found into the shared-leaves structure;

generating the subset of the plurality of order-preserving integer codes for a corresponding subset of the plurality of string values; and providing a list of the plurality of order-preserving integer codes, the list including the generated subset of the plurality of order-preserving integer codes.

9. The method of claim 8 further comprising:

propagating the plurality of order-preserving integer codes to the shared-leaves structure of the dictionary via a decode index; and updating the encode index and the decode index.

10. The method of claim 8 further comprising:

rewriting a string value from the plurality of string values in an equality-predicate or in a range-predicate with a corresponding integer code from the plurality of order-preserving integer codes; and rewriting a string prefix of a prefix-predicate with corresponding integer code ranges from the plurality of order-preserving integer codes.

11. The method of claim 8, wherein obtaining the plurality of order-preserving integer codes further comprises executing a sequential search operation over the compressed leaf data without decompression of the compressed leaf data.

12. The method of claim 8, wherein the encode index comprises a cache-sensitive array trie index or a cache-sensitive prefix trie index.

13. The method of claim 12, wherein the cache-sensitive array trie index comprises:

storing the plurality of string values in an array;

propagating in preorder the plurality of string values to the shared-leaves structure via variable buffers at each cache-sensitive array trie node to populate the array only once per bulk; and generating the subset of the plurality of order-preserving integer codes for the corresponding subset of the plurality of string values in parallel.

14. The method of claim 12, wherein the cache-sensitive prefix trie comprises:

calculating a first shortest prefix to distinguish a largest value of a first leaf and a smallest value of a second leaf of the cache-sensitive prefix trie;

calculating a second shortest prefix to distinguish the largest value of the second leaf and the smallest value of a third leaf;

if there is more than one node in a level of the cache-sensitive prefix trie, adding a second level on top with a node storing the calculated first shortest prefix and second shortest prefix, wherein the node is a root of the cache-sensitive prefix trie.

15. A system comprising:

a column-oriented database system;

a dictionary-based storage unit specifying a mapping between a plurality of variable-length string values and a plurality of integer codes in the column-oriented database system;

shared-leaves data structures that hold data of the dictionary-based storage unit in sorted order in their leaves;

a processor in communication with the dictionary-based storage unit, the processor operable to encode the plurality of variable-length string values to the plurality of integer codes and decode the plurality of integer codes to the plurality of variable-length string values using the shared-leaves data structures.

16. The system of claim 15, wherein the shared-leaves data structures include an encode index to encode the plurality of variable-length string values and a decode index to decode the plurality of integer codes.

17. The system of claim 16, wherein the encode index supports propagation of the plurality of variable-length string values to the shared leaves, lookup of the plurality of integer codes, and generation of a second plurality of integer codes if a subset of the plurality of integer codes is not found during lookup.

18. The system of claim 16, further comprising a cache-sensitive array trie index or a cache-sensitive prefix trie index used on top of the shared-leaves data structures as the encode index.

19. The system of claim 18, wherein the cache-sensitive array trie index comprises an array to store the plurality of variable-length string values.

20. The system of claim 18, wherein the cache-sensitive prefix trie index comprises a node that includes shortest prefixes that enable propagation of the plurality of variable-length string values to child nodes of the cache-sensitive prefix trie.

* * * * *